R. E. JACKSON AND B. O. YEARWOOD.
TRANSMISSION GEARING.
APPLICATION FILED APR. 9, 1919.

1,340,486. Patented May 18, 1920.

Inventors,
R. E. Jackson &
B. O. Yearwood.
By C. L. Parker
Atty.

UNITED STATES PATENT OFFICE.

ROBERT EDWARD JACKSON AND BYRD O. YEARWOOD, OF PRINCETON, WEST VIRGINIA.

TRANSMISSION-GEARING.

1,340,486.   Specification of Letters Patent.   Patented May 18, 1920.

Original application filed December 18, 1917, Serial No. 207,755. Divided and this application filed April 9, 1919. Serial No. 288,847.

*To all whom it may concern:*

Be it known that we, ROBERT E. JACKSON and BYRD O. YEARWOOD, citizens of the United States, residing at Princeton, in the county of Mercer and State of West Virginia, have invented certain new and useful Improvements in Transmission-Gearing, of which the following is a specification.

The present invention relates to transmission gearing, adapted to drive a mechanical stoker, while not necessarily restricted to this use.

An important object of the invention is to provide novel and simple means for transmittting reciprocatory movements into a rotary movement.

Other objects and advantages of the invention will be apparent during the course of the following description.

The subject-matter of this application is shown and described, but not claimed, *per se* in our co-pending application for mechanical stoker, filed December 18, 1917, Serial No. 207,755, of which this application is a division.

Figure 1:
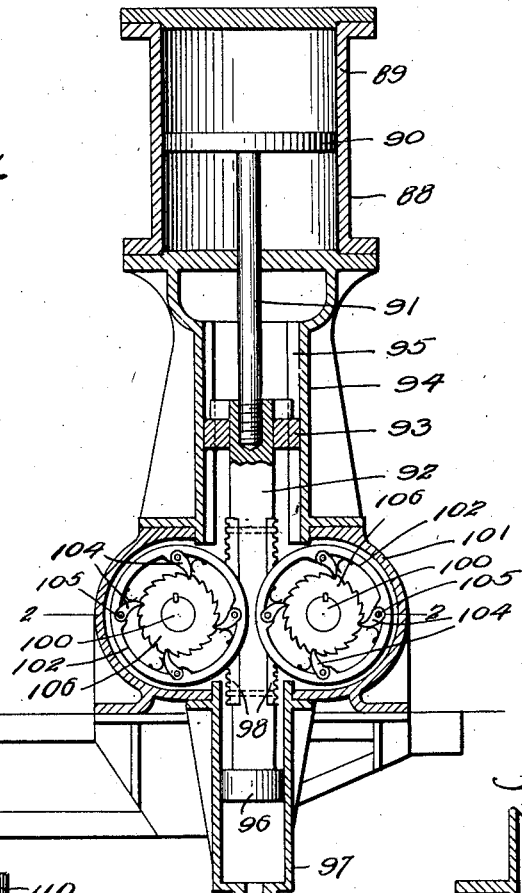
Figure 2:
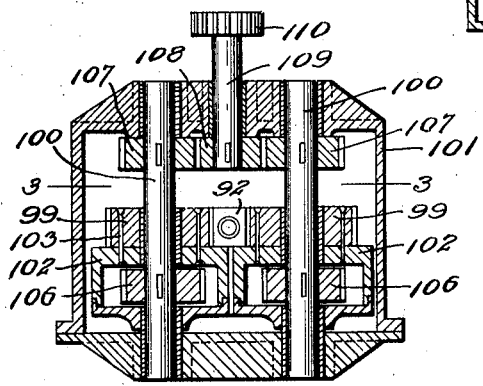
Figure 3:
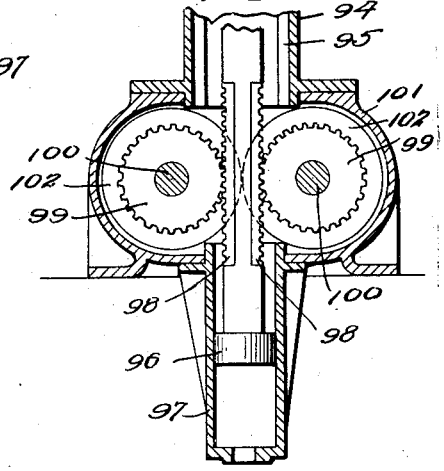

In the accompanying drawings forming a part of this specification and in which like numerals are employed to designate like parts throughout the same, Figure 1 is a vertical longitudinal sectional view through apparatus embodying our invention, Fig. 2 is a horizontal sectional view taken on line 2—2 of Fig. 1; and, Fig. 3 is a vertical sectional view taken on line 3—3 of Fig. 2.

In the drawings, wherein for the purpose of illustration is shown a preferred embodiment of our invention, the numeral 88 designates an engine, preferably a steam engine of the reciprocatory type. This engine includes a cylinder 89, within which a piston 90 is mounted to reciprocate. The usual valve mechanism (not shown) is employed for controlling the inlet and exhaust of steam to the opposite ends of the cylinder 89. Connected with the piston 90 is a depending rod 91, having connection with a vertical reciprocatory bar 92. This bar carries a disk cross head 93, operating within a tubular guide 94 having ribs 95, operating within grooves in the disk cross head. At its lower end the bar 92 has a second disk cross head 96 secured thereto, and adapted to operate within a tubular guide 97. Arranged upon the opposite edges of the bar 92 and secured thereto by any suitable means are racks 98, in permanent engagement with gears 99, for rotating the same in opposite directions. The gears 99 are rotatable upon transverse shafts 100, journaled in the opposite sides of a gear casing 101. The gears 99 have flanged wheels 102, bolted or otherwise rigidly attached thereto, as shown at 103. These flanged wheels 102 are provided with sets of pawls 104, pivoted thereto, as shown at 105. The pawls face in the same direction, and are disposed to engage with ratchet wheels 106, which are rigidly secured to the shafts 100. Rigidly connected with the shafts 100 are gears 107, engaging a gear 108, arranged therebetween. The gear 108 is rigidly secured to a stub shaft 109, having a gear 110 rigidly secured thereto. The gear 110 engages with the member to be driven.

In view of the foregoing description, it is obvious that when the bar 92 moves downwardly, it will turn the gears 99 and the flanged wheels 102 secured thereto, in opposite directions, as indicated by the arrows thereon. The pawls carried by the flanged wheel 102 at the left, Fig. 1, will turn the ratchet wheel 106 in the direction of the arrow thereon, while the pawls 104 carried by the flanged wheel 102 to the right will trip upon the ratchet wheel 106. The rotation of the ratchet wheel 106 to the left is transmitted to the shaft 110 to the left, driving the gear 107, carried thereby, which in turn drives the gear 108. This rotation is imparted to the shaft 109. Upon the upstroke of the bar 92, the ratchet wheel 106 to the right will be turned in the direction of its arrow, while the other ratchet wheel will be idle. The shaft 100, to the right is rotated, which rotation is imparted to the shaft 109 through the medium of the gears 107 and 108. The shaft 109 is therefore turned in the same direction.

It is to be understood that the form of our invention herewith shown and described is to be taken as the preferred example of the same, and that various changes in the shape, size, and arrangement of parts may be resorted to without departing from the spirit of the invention or the scope of the subjoined claim.

Having thus described our invention, we claim:

In an apparatus of the character described, a reciprocating member provided upon opposite sides thereof with rack bars, a guide casing surrounding the upper and lower ends of the reciprocating member and adapted to serve as a guide therefor, a gear casing disposed intermediate the ends of the guide casing and comprising an enlargement of the guide casing, a pair of parallel shafts having their ends journaled in opposite sides of the gear casing and disposed on opposite sides of the reciprocating member, a pair of gears rotatably mounted upon the said shafts and engaging said rack bars, wheels rigidly secured to the gears to rotate therewith, pawls within said wheels, ratchet wheels rigidly secured to the shaft and engaged by the pawls, a shaft extending through and rotatably mounted within the gear casing, a gear rigidly secured to said shaft interiorly of the gear casing and a pair of gears rigidly secured to the parallel shafts and engaging said gear, substantially as described.

In testimony whereof we affix our signatures in presence of two witnesses.

ROBERT EDWARD JACKSON.
BYRD O. YEARWOOD.

Witnesses:
C. J. MOORE,
W. T. DAVIS.